US009257910B2

(12) United States Patent
Lindberg-Poulsen et al.

(10) Patent No.: US 9,257,910 B2
(45) Date of Patent: Feb. 9, 2016

(54) ISOLATED BOOST FLYBACK POWER CONVERTER

(75) Inventors: Kristian Lindberg-Poulsen, Copenhagen N (DK); Ziwei Ouyang, Holte (DK); Gökan Sen, Holte (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 208 days.

(21) Appl. No.: 14/131,034

(22) PCT Filed: Jun. 11, 2012

(86) PCT No.: PCT/EP2012/061020
§ 371 (c)(1),
(2), (4) Date: Apr. 28, 2014

(87) PCT Pub. No.: WO2013/004453
PCT Pub. Date: Jan. 10, 2013

(65) Prior Publication Data
US 2014/0241012 A1    Aug. 28, 2014

Related U.S. Application Data

(60) Provisional application No. 61/505,205, filed on Jul. 7, 2011.

(30) Foreign Application Priority Data

Jul. 7, 2011    (EP) .................................... 11172997

(51) Int. Cl.
H02M 3/335    (2006.01)
H02M 7/5387   (2007.01)
H02M 1/00     (2007.01)

(52) U.S. Cl.
CPC .......... H02M 3/335 (2013.01); H02M 3/33523 (2013.01); H02M 3/33553 (2013.01); *H02M 2001/0064* (2013.01)

(58) Field of Classification Search
CPC ... H02M 3/3376; H02M 7/5387; G05F 1/325; G05F 1/33
USPC ............ 363/15, 16, 17, 95, 98; 323/250, 251, 323/362
See application file for complete search history.

(56) References Cited

U.S. PATENT DOCUMENTS

| 4,339,792 A * | 7/1982 | Yasumura | G05F 1/325 323/248 |
|---|---|---|---|
| 4,864,478 A | 9/1989 | Bloom | |
| 4,876,638 A * | 10/1989 | Silva | H01F 29/14 323/250 |
| 5,208,739 A | 5/1993 | Sturgeon | |
| 5,436,818 A | 7/1995 | Barthold | |
| 6,496,389 B1 * | 12/2002 | Yasumura | H02M 1/4258 363/21.02 |
| 7,034,647 B2 * | 4/2006 | Yan | H01F 27/38 336/178 |
| 2004/0218404 A1 | 11/2004 | Yan | |
| 2009/0196073 A1 * | 8/2009 | Nakahori | H02M 3/28 363/17 |
| 2009/0231885 A1 * | 9/2009 | Won | H01F 38/10 363/17 |
| 2010/0067263 A1 * | 3/2010 | Qian | H02M 3/285 363/21.12 |
| 2011/0149613 A1 | 6/2011 | Lanni | |

FOREIGN PATENT DOCUMENTS

EP    1659678 A2    8/2006

OTHER PUBLICATIONS

International Search Report and Written Opinion for PCT/EP2012/061020, dated Apr. 29, 2013.
* cited by examiner

*Primary Examiner* — Gary L Laxton
(74) *Attorney, Agent, or Firm* — Peter A. Nieves; Sheehan Phinney Bass + Green PA

(57) ABSTRACT

An isolated boost power converter comprises a magnetically permeable multi-legged core (102) comprising first and second outer legs (132; 136) and a center leg (134) having an air gap (138) arranged therein. A boost inductor (Lboost) is wound around the center leg (134) or the first and second outer legs (132; 136) of the magnetically permeable multi-legged core (102). The boost inductor (Lboost) is electrically coupled between an input terminal (104) of the boost converter and a transistor driver (106) to be alternatingly charged and discharged with magnetic energy. A first and second series connected secondary transformer windings (SW1; SW2) with a center-tap (116) arranged in-between are wound around the first and second outer legs (132; 136), respectively, of the magnetically permeable multi-legged core (102). In a first discharge state, the magnetic energy stored in the boost inductor (Lboost) is discharged by directing a discharge current from the boost inductor through a primary transformer winding (PW1; PW2) and in a second discharge state, the magnetic energy stored in the boost inductor (Lboost) is discharged by discharging a magnetic flux through the first and second secondary transformer windings (SW1; SW2).

14 Claims, 8 Drawing Sheets a)

b)

ISOLATED BOOST FLYBACK POWER CONVERTER

The present invention relates to an isolated boost power converter comprising a magnetically permeable multi-legged core comprising first and second outer legs and a center leg having an air gap arranged therein. A boost inductor is wound around the center leg or the first and second outer legs of the magnetically permeable multi-legged core. The boost inductor is electrically coupled between an input terminal of the boost converter and a transistor driver to be alternatingly charged and discharged with magnetic energy. A first and second series connected secondary transformer windings with a center-tap arranged in-between are wound around the first and second legs, respectively, of the magnetically permeable multi-legged core. In a first discharge state, the magnetic energy stored in the boost inductor is discharged by directing a discharge current from the boost inductor through a primary transformer winding and in a second discharge state, the magnetic energy stored in the boost inductor is discharged by discharging a magnetic flux through the first and second secondary transformer windings. In this manner, the first and second secondary transformer windings may replace the traditional separate flyback winding utilized for start-up purposes of isolated boost power converters.

BACKGROUND OF THE INVENTION

Isolated boost power converters are generally accepted as a highly efficient converter topology or architecture for high power converters with low input voltage and high output voltage. Isolated boost power converters are very useful for DC-DC voltage conversion in a diverse range of applications such as fuel cell converters, electric vehicles applications and avionic applications. However, a disadvantage of prior art isolated boost power converters is the need for a so-called flyback winding during a start-up phase or state of the power converter. During start-up, a duty cycle of a Pulse Width Modulated (PWM) control signal applied to a driver circuit must be ramped-up slowly to avoid excessive in-rush currents. During ramp-up of the duty cycle, it starts at a value much less than 0.5 which means that the driver circuit is placed in an open or cut-off state during a cycle of the PWM control signal without any low impedance path to a positive or negative input voltage terminal or rail. This situation leads to excessive voltage spikes across the boost inductor(s) which spikes may exceed the rated break-down voltage of semiconductor devices, such as MOS transistors, of the driver circuit so as to destroy these. This problem has previously been addressed by adding a flyback winding and a flyback diode to the isolated power converter providing a discharge path for energy stored in the boost inductor. However, the addition of a flyback winding has numerous drawbacks as the flyback winding is a separate power transferring element that is relatively costly, adds to size and increases component count of the boost power converter.

SUMMARY OF THE INVENTION

A first aspect of the invention relates to an isolated boost power converter comprising a magnetically permeable multi-legged core comprising first and second outer legs and a center leg having an air gap arranged therein. An input terminal is adapted for receipt of an input voltage, $V_{in}$. A boost inductor is wound around the center leg or the first and second outer legs of the magnetically permeable multi-legged core where the boost inductor is electrically coupled between the input terminal and a driver to be alternatingly charged and discharged with magnetic energy. The driver has a driver output coupled to a primary transformer winding wound around the first and second outer legs of the magnetically permeable transformer core and the driver is configured to generate a primary voltage to the primary transformer winding in accordance with a driver control signal. First and second series connected secondary transformer windings with a center-tap arranged in-between are wound around the first and second outer legs, respectively, of the magnetically permeable multi-legged core and a rectification circuit is coupled to respective outputs of the first and second secondary transformer windings to provide a rectified converter output voltage, $V_{out}$. In a first discharge state, the magnetic energy stored in the boost inductor is discharged by directing a discharge current from the boost inductor through the primary transformer winding. In a second discharge state, the magnetic energy stored in the boost inductor is discharged by discharging a magnetic flux through the first and second secondary transformer windings.

The ability provided by the present isolated boost power converter to discharge magnetic energy stored in the boost inductor through the first and second secondary transformer windings provides a novel solution to start-up of isolated boost power converters/DC-DC converters allowing these to operate below 50% duty cycle, D, of a Pulse Width Modulated (PWM) driver control signal. Consequently, the output voltage range at $V_{out}$ can be extended down to zero without utilizing the traditional separate flyback winding because the first and second secondary transformer windings provide the functionality of the separate flyback winding of prior art boost power converters. The omission of the traditional separate flyback winding leads to a significant simplification of electric and magnetic circuit design, reduces component count, improves reliability, reduces the price and size of the power converter and decreases manufacturing costs. Furthermore, power conversion efficiency during start-up, and for operation below 50% duty cycle of the PWM driver control signal, is improved without affecting normal boost operation because copper material is not wasted on the traditional flyback winding. It is also noticeable that secondary transformer winding normally is designed for low winding resistance such that the additional flyback winding functionality requires no modification of an existing secondary transformer winding. The normal low resistance of existing secondary transformer windings also means that its use as flyback winding in accordance with the present invention can increase power efficiency compared with the traditional separate flyback winding. Furthermore, the second discharge state also allows stored magnetic energy in the boost inductor to be discharged or dissipated during error states of the isolated boost converter which e.g. may be caused by switching errors in the driver or an output short circuit condition.

The skilled person will understand that the term "isolated" does not imply that the input and output sides of the present isolated boost power converter necessarily are galvanically isolated by the magnetically permeable multi-legged core even though they may be so in numerous embodiments of the invention. Respective negative terminals or rails of the rectified output voltage $V_{out}$ and the input voltage $V_{in}$ may be electrically coupled to each other, for example through a shared GND connection such that a galvanic connection is established between the input/primary and output/secondary sides of the isolated boost power converter.

According to a preferred embodiment, during the second discharge state the first and second secondary transformer windings are coupled in parallel from the center-tap arranged between first and second series connected secondary transformer windings to the rectified converter output voltage, $V_{out}$. This allows discharge current to be directed to the rectified converter output voltage by both half-windings so as to minimize conductive losses in the secondary transformer winding. The magnetic flux flowing through the first and second secondary transformer windings, generated by the magnetic energy stored in the boost inductor, is converted to respective discharge currents flowing through the first and second secondary half windings $SW_1$ and $SW_2$. Thereby, power or energy is transferred to the rectified converter output voltage so as to control the latter when the output voltage is below a minimum voltage required for normal boost mode operation.

The present isolated boost converter is preferably configured such that the second discharge state is automatically entered in response to a reversal of magnetic flux rate in the boost inductor. The reversal of magnetic flux rate may be caused by the driver entering a non-conducting or OFF-state for example when a duty cycle of a pulse width modulated driver control signal is less than 0.5. Under these conditions, a resulting drop in charging current flowing into the boost inductor will cause the reversal of the magnetic flux rate. The driver may for example enter the non-conducting state when all transistors of the driver simultaneously are in non-conducting states. The driver may comprise a half-bridge or an H-bridge with two or four MOS transistors, respectively. The H-bridge or full-bridge transistor driver may have first and second complementary driver outputs coupled to respective ends of the primary transformer winding. When all transistors of the half-bridge or full-bridge transistor driver are placed in non-conducting states by the pulse width modulated driver control signal, a voltage across the driver rapidly rises to a destructive level due the continued effort of the boost inductor to force current towards the driver. This undesired rise of boost inductor voltage takes place during start-up of the isolated boost converter where the duty cycle D of the pulse width modulated driver control signal must be initialized to a value below 0.5, preferably close to zero, to avoid large in-rush currents. However, the automatic entry into the second discharge state provided by this embodiment eliminates the generation of destructive boost inductor voltage spikes by discharging the magnetic energy stored in the boost inductor as the discharge currents running through the first and second secondary transformer windings. The automatic entry of the second discharge state may be caused by the above-mentioned reversal of the flux rate through the boost inductor due to a sudden decrease of boost inductor current. The decrease of boost inductor current may be caused by the off-state entry of the driver or by an error condition.

In accordance with a preferred embodiment of the invention, the boost converter is configured to change between the first and second discharge states by selectively coupling and decoupling the boost inductor from the secondary transformer windings such that:
  during the first discharge state, magnetically decoupling the boost inductor from the first and second secondary transformer windings to deliver the magnetic energy to the primary transformer winding;
  during the second discharge state, magnetically coupling the boost inductor to the first and second secondary transformer windings through a shared flux path in the magnetically permeable multi-legged core. The shared flux path may comprise two separate shared flux paths such that a first shared flux path runs between the boost inductor and the first secondary transformer winding and a second shared flux path runs between the boost inductor and the second secondary transformer winding.

The number of windings of the first and second secondary transformer windings is preferably substantially identical to allow effective decupling between the boost inductor and the first and second secondary transformer windings in the first discharge state.

As previously mentioned the first and second secondary transformer windings are preferably configured to discharge the magnetic energy stored in the boost inductor by supplying a discharge current to the rectified converter output voltage, $V_{out}$, so as to transfer energy to the output. In this scheme, the first and second secondary transformer windings act jointly as a flyback winding.

According to an advantageous embodiment of the invention, the magnetically permeable multi-legged core comprises:
  a center leg, having an air gap arranged therein,
  a first outer leg and a second outer leg; The boost inductor is magnetically coupled to the center leg to store the magnetic energy therein and the first and second secondary transformer windings are wound around the first and second outer legs, respectively. This topology of the magnetically permeable multi-legged core may comprise a conventional EI core. The air gap is well-suited for storage of the magnetic energy due to its high reluctance or low magnetic permeability and preferably has a height between 0.1 mm and 10 mm. In one embodiment, the boost inductor is wound around the center leg while in other embodiments windings of the boost inductor is split into two series connected half-windings wound around respective ones of the first and second outer legs. In the latter embodiment, the boost inductor is magnetically coupled to the air gap by a suitable magnetically permeable structure of the magnetically permeable multi-legged core.

In yet another embodiment of the invention which comprises the center leg with the air gap and the first and second outer legs, the primary transformer winding comprises first and second series connected half-windings wound around the first and second outer legs, respectively, of the magnetically permeable multi-legged core. Preferably, the first and second series connected half-windings have an identical number of windings and the first and second series connected secondary transformer windings likewise have an identical number of windings.

In this embodiment, the first half-winding of the primary transformer winding and the first secondary transformer winding are both wound around the first outer leg of the magnetically permeable multi-legged core. Likewise, the second half-winding of the primary transformer winding and the second secondary transformer winding are both wound around the second outer leg of the magnetically permeable multi-legged core to achieve good magnetic coupling between the primary winding and second winding.

The skilled person will understand that the present isolated boost power converter may comprise many different primary side circuit topologies in addition to the previously mentioned half-bridge and full-bridge drivers. In one embodiment, the primary side comprises a first boost inductor and a second boost inductor such that the first boost inductor is coupled between the input terminal and a first transistor driver output. The first transistor driver output is coupled to a first end or first winding output of the primary transformer winding. The second boost inductor is coupled between the input terminal and a second transistor driver output. The second transistor driver output is coupled to a second end or second winding output of the primary transformer winding. The first and second transistor driver outputs may comprise respective drain or collector terminals of a MOS or bipolar transistor. The use of at least two boost inductors is advantageous because this reduces driver component count for example by reducing the number of semiconductor switches that may comprise respective transistor switches.

In another embodiment, the boost inductor comprises a first half-winding and a second half-winding of the primary transformer winding to provide an integrally formed boost inductor and primary winding which leads to improved copper utilization. In this embodiment, the magnetic energy stored in the boost inductor is directly transferred to the first and second secondary transformer windings by a magnetic flux through the magnetically permeable multi-legged core. In the above-discussed embodiments with a separate primary transformer winding and boost inductor, magnetic energy is initially stored in the boost inductor and subsequently released or discharged, during the first discharge state, as discharge current flowing through the primary transformer winding to induce a primary side voltage therein.

In a number of embodiments of the isolated boost power converter a rectifying element is electrically coupled to the center-tap to conduct a discharge current, during the second discharge state, from the first and second secondary transformer windings to the rectified converter output voltage, $V_{out}$. The discharge current is induced by the magnetic flux generated by the boost inductor flowing through the first and second secondary transformer windings. The rectifying element is preferably electrically coupled to a predetermined electric potential of the boost converter such as a power supply rail, including ground, a negative DC supply rail or a positive DC supply rail, of the secondary side of the isolated boost power converter. The rectifying element may be required if the rectification circuit comprises a full-bridge rectifier or a voltage doubler because during the first discharge state, the center-tap voltage differs from both the rectified converter output voltage and a negative rectified converter output voltage.

Alternatively, the rectification circuit may comprise a center-tapped rectifier in accordance with a preferred embodiment of the invention such that the rectifying element in series with the center-tap can be avoided. According to this embodiment, the center-tap is electrically connected to a negative rectified converter output voltage or the rectified converter output voltage, $V_{out}$, the respective outputs of the first and second secondary transformer windings are coupled to an opposite output voltage relative to the center-tap voltage through first and second rectifying elements. Each of the first and second rectifying elements preferably comprises a semiconductor diode or diode-coupled transistor.

As previously mentioned, the rectification circuit may comprise a voltage multiplier for example a voltage doubler circuit to increase the level of the rectified converter output voltage, $V_{out}$. The skilled person will understand that the rectifying element and/or the rectification circuit each may comprise one or more semiconductor diode(s), diode-coupled transistor(s) or synchronously controlled transistor switch(es). Each of the semiconductor diodes may comprise a MOS diode, a bipolar diode, a Schottky diode or any combination thereof.

According to one advantageous embodiment or variant of the invention discussed above with the center leg surrounded by the first and second outer legs, the isolated boost power converter comprises:

a second magnetically permeable multi-legged core and a second boost inductor magnetically coupled to a center leg of the second magnetically permeable multi-legged core to store magnetic energy therein. The second boost inductor being electrically coupled between the input terminal and a second driver to be alternatingly charged and discharged with magnetic energy. The second driver having a second driver output coupled to a second primary transformer winding wound around a first outer leg and a second outer leg of the second magnetically permeable transformer core. The second driver is configured to generate a second primary voltage to the second primary transformer winding in accordance with the driver control signal. The boost power converter further comprises first and second secondary transformer windings wound around the first outer leg and the second outer leg, respectively, of the second magnetically permeable multi-legged core. The first secondary transformer winding of the second magnetically permeable multi-legged core is coupled in series between the rectification circuit and the output of the first secondary transformer winding of the first magnetically permeable multi-legged core. The second secondary transformer winding of the second magnetically permeable multi-legged core is coupled in series between the rectification circuit and the output of the second secondary transformer winding of the magnetically permeable multi-legged core, or first magnetically permeable multi-legged core, such that:

in the first discharge state, the respective magnetic energies stored in the first and second boost inductors are discharged by directing respective discharge currents from the respective boost inductors through the respective primary transformer windings, in the second discharge state, the respective magnetic energies stored in the respective boost inductors are discharged by discharging respective magnetic fluxes through the respective first and second secondary transformer windings.

According to the latter embodiment of the invention, the first and second secondary transformer windings of the first magnetically permeable multi-legged core are electrically coupled to the rectification circuit in an indirect manner through the respective ones of the first and second secondary transformer windings of the magnetically permeable multi-legged core. The first and second secondary transformer windings are therefore coupled in series such that the rectified converter output voltage, $V_{out}$, is doubled in a symmetrical architecture or topology of transformer windings mounted on the magnetically permeable multi-legged core and the first magnetically permeable multi-legged core. The magnetically permeable multi-legged cores may be provided as separate parts, for example arranged in abutment or proximate to each other, or as an integrally formed core element which has a shared magnetically permeable structure or leg. In a preferred embodiment, the magnetically permeable multi-legged cores share a common magnetic flux path extending through a shared magnetically permeable leg. In the latter embodiment, the magnetically permeable multi-legged cores may advantageously be configured to provide magnetic flux cancellation or suppression in the shared magnetically permeable leg. This feature saves magnetic material so as to reduce material costs and size of the isolated boost power converter. The above-discussed embodiments of the present invention based on the first magnetically permeable multi-legged core and the magnetically permeable multi-legged core possess numerous favourable characteristics: scalability by the addition of further magnetically permeable multi-legged cores and associated primary side and secondary side transformer windings and drivers. This property is highly beneficial because the isolated boost power converter can readily be adapted to a whole range of applications with varying power transfer capacities. Thus, saving R&D design efforts and time, reducing design risk, reducing manufacturing costs etc. In addition, the current rating of each semiconductor switch of the first and second drivers can be halved for a given current handling capacity due to the split of input current between the first, second and possibly further drivers.

The driver control signal may comprise a PWM signal having an adjustable duty cycle, D. The adjustable duty cycle may be used to set a desired or target DC level of the rectified converter output voltage, $V_{out}$. The duty cycle is preferably set to a value between 0.5 and 1.0 after exiting or leaving a start-up state or mode, i.e. during normal boost mode operation of the isolated boost converter. The duty cycle, D, may be set or controlled in connection with a closed loop feedback control scheme for controlling any of the state variables of the isolated power converter, such as the boost inductor current or the rectified converter output voltage, $V_{out}$.

Another aspect of the invention relates to a method of generating a rectified converter output voltage, $V_{out}$, from an input voltage, $V_{in}$, by an isolated boost power converter according to any of the preceding claims. The method comprises steps of:
  generating a pulse width modulated driver control signal,
  supplying the pulse width modulated driver control signal to the driver,
  gradually increasing a duty cycle, D, of the pulse width modulated driver control signal from below 0.5, preferably below 0.1, to a value above 0.5, preferably between 0.55 and 0.99,
  adjusting the duty cycle, D, to a desired value to reach a desired or target AC voltage waveform or DC voltage level at the rectified converter output voltage, $V_{out}$. As previously explained, before the isolated boost converter reaches its normal operating state, a start-up mode or state is required. During the start-up phase or mode of the isolated boost power converter the duty cycle of the Pulse Width Modulated (PWM) driver control signal applied to the driver must be ramped-up slowly to avoid excessive in-rush currents. During ramp-up of the duty cycle, it preferably starts at a value much less than 0.5 which means that the driver is placed in an off-state or cut-off state during a certain time interval of a cycle of the PWM signal. The off-state means the driver lacks a low resistance electric path to the input voltage or a negative input voltage rail such as ground, GND. However, thanks to the ability of the first and second secondary transformer windings to discharge the magnetic flux stored in the boost inductor, the present isolated boost power converter can enter and exit the start-up mode so as to establish an initial output voltage as $V_{out}$ without any need for a separate flyback winding or other auxiliary start-up circuitry.

BRIEF DESCRIPTION OF THE DRAWINGS

A preferred embodiment of the invention will be described in more detail in connection with the appended drawings, in which.

DETAILED DESCRIPTION OF PREFERRED EMBODIMENTS

The embodiments described in detail below are particularly well-suited for power converters providing DC voltage amplification or step-up. However, the skilled person will understand that power converter in accordance with the present invention are highly useful for other types of applications both in step-up and step down voltage converting applications.

Figure 1:
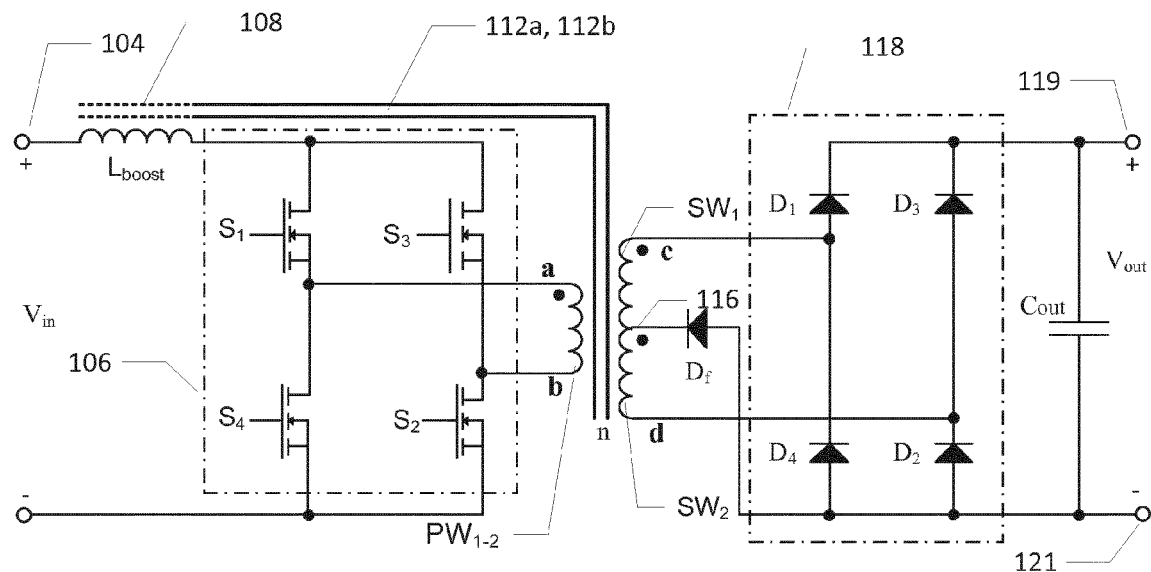
FIGS. 1a) and 1b) illustrate schematically an electrical circuit diagram and a magnetic circuit diagram, respectively, of an isolated boost power converter in accordance with a first embodiment of the invention,
  FIGS. 2a) and 2b) illustrate schematically an electrical circuit diagram and a magnetic circuit diagram, respectively, of the isolated boost power converter in accordance with the first embodiment of the invention during a charging subinterval of boost mode operation,
  FIGS. 3a) and 3b) illustrate schematically an electrical circuit diagram and a magnetic circuit diagram, respectively, of the isolated boost power converter in accordance with the first embodiment of the invention during a first discharge state of the boost mode operation,
  FIGS. 4a) and 4b) illustrate schematically an electrical circuit diagram and a magnetic circuit diagram, respectively, of the isolated boost power converter in accordance with the first embodiment of the invention during a charging subinterval of a start-up mode.
Figure 1:
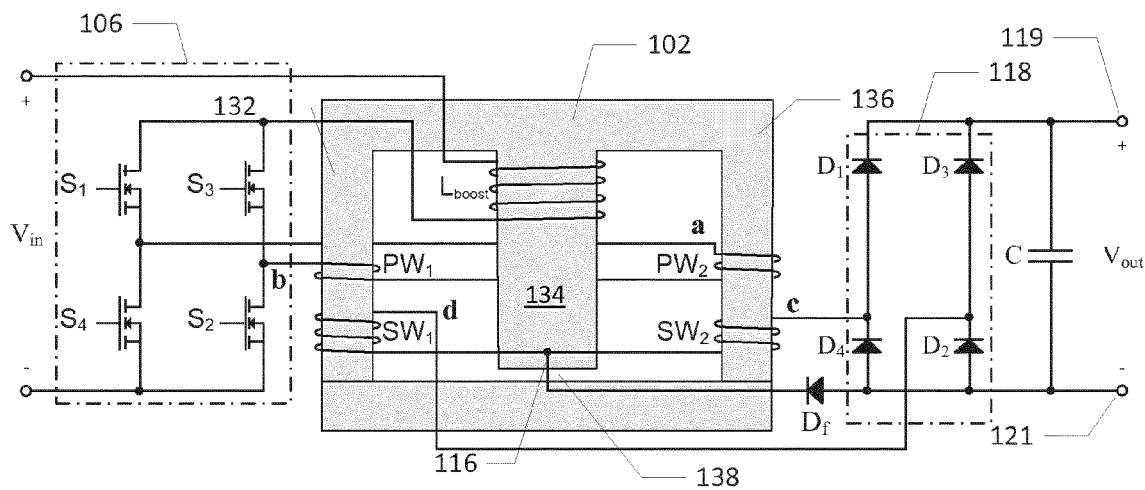

FIG. 1a) illustrates schematically an electrical circuit diagram of an isolated boost power converter 100 in accordance with a first embodiment of the present invention. The isolated boost power converter 100 comprises a magnetically permeable multi-legged core in form of a three legged EI core 102. The three legged EI core 102 comprises a center leg 134 surrounded by a first outer leg 132 and a second outer leg 136 in a mirror-symmetrical layout or structure about a central vertical axis extending through the center leg 134. The center leg 134 comprises an air gap 138 which allows magnetic energy of a boost inductor, $L_{boost}$, to be stored therein. The isolated boost power converter 100 comprises an input terminal 104 for receipt of an input voltage, Vin. The input voltage may be a DC voltage between 5 Volt and 100 Volt. The boost inductor, $L_{boost}$, is arranged or wound around the center leg 134 of the three legged EI core 102 and electrically coupled between the input terminal 104 and a transistor driver 106 to be alternatingly charged and discharged with magnetic energy through the transistor driver 106. The primary and secondary windings are both split into two half-windings distributed between the first and second outer legs 132, 136 so that the flux from the boost inductor, $L_{boost}$, is decoupled from the transformer function in normal boost operation. The transformer winding outputs or ports are marked a; b; c and d in both the electrical circuit diagram of FIG. 1a) and the magnetic diagram of FIG. 1b). The transistor driver 106 comprises four NMOS transistors $S_1$-$S_4$ coupled as a full-bridge or H-bridge such that a first driver output, at a shared junction or node in-between the NMOS transistors $S_1$ and $S_4$, is electrically coupled to the first winding output, a, of a primary transformer winding or primary side transformer winding $PW_{1-2}$. A second driver output, at a shared junction or node in-between NMOS transistors $S_2$ and $S_3$, is electrically coupled to the second winding output, b, of the primary transformer winding $PW_{1-2}$. The primary transformer winding $PW_{1-2}$ is split as mentioned above so as to comprise two series connected half-windings $PW_1$ and $PW_2$ (refer to FIG. 1b)) wound around the first and second outer legs, 132, 136, respectively, of the EI core 102.

The transistor driver 106 consequently generates a primary voltage across the primary winding $PW_{1-2}$ in accordance with a driver control signal, such as a pulse width modulated control signal, adapted to individually control the switching of four semiconductor switches implemented as NMOS transistors $S_1$-$S_4$. Each of the NMOS transistors $S_1$-$S_4$ is switched between conducting and non-conducting states, i.e. on-state or off-state, in accordance with an individual driver control signal applied to a gate terminal of the NMOS transistor. The isolated boost power converter 100 comprises first and second series connected secondary transformer windings, $SW_1$ and $SW_2$, respectively, having a center-tap or midpoint 116 arranged in-between them. The first and second series connected secondary transformer windings, $SW_1$ and $SW_2$, respectively, are wound around the first outer leg 132 and the second outer leg 136, respectively, i.e. separate legs of the EI core 102 such that the second secondary transformer winding $SW_2$ is arranged on the same outer leg 136 as the second half-winding $PW_2$ of the primary transformer winding. Likewise, the first secondary transformer winding $SW_1$ is arranged on the same outer leg 132 as the first half-winding $PW_1$ of the primary transformer winding. A voltage transfer ratio between the primary and secondary sides of the transformer function provided by the EI core 102 is set by a turns ratio, n, between the number of secondary side transformer windings relative to the number of primary side transformer windings. In the present embodiment, this turns ratio, n, equals the number of secondary transformer windings of $SW_1$ and $SW_2$ combined divided by the number of primary transformer windings of $PW_1$ and $PW_2$ combined. The turns ratio, n, may naturally vary with requirements of a particular application, in particular whether the boost converter is intended to function as a step-up or step-down converter. The turns ratio, n, is preferably set to value between 0.25 and 100 such as between 1.0 and 64. The integration of the boost inductor, $L_{boost}$, the primary transformer winding $PW_{1-2}$ and the first and second series connected secondary transformer windings, $SW_1$ and $SW_2$ on the common or shared EI core 102 is often referred to as "integrated magnetics" in the art.

A rectification circuit 118 is electrically coupled to respective outputs of the first and second secondary windings to provide a rectified converter output voltage, $V_{out}$, between rectified converter output voltage, $V_{out}$, 119 and a negative rectified converter output voltage 121. A supply capacitor C or $C_{out}$ is coupled between these converter output voltages or rails to suppress ripple voltages at the output of the rectification circuit 118 and provide an energy reservoir stabilising the output voltage, $V_{out}$. In the depicted isolated boost power converter 100, the input side or primary side and secondary side are galvanically isolated by the EI core 102. However, the skilled person will understand that the negative terminals or rails of the output voltage $V_{out}$ and the input voltage may be electrically coupled to each other, for example through a shared GND connection without compromising the desired boost inductor discharge functionality of the first and second secondary transformer windings of the present isolated boost power converter 100. A rectifying element in form of a semiconductor diode, $D_f$, is coupled between the center-tap 116 and the negative rectified converter output voltage 121 to facilitate a flow of discharge current through the first and second secondary transformer windings, $SW_1$ and $SW_2$, respectively. The discharge current subsequently flows through the rectification circuit 118 and to the output terminal or node 119 providing the rectified converter output voltage, $V_{out}$, so as to transfer energy to the output, facilitating start-up of the power converter 100 as explained in further detail below.

The transfer characteristic of the isolated boost converter is set by a duty cycle, D, of the Pulse Width Modulated (PWM) driver control signal, during normal boost operation according to:

$$\frac{V_{out}}{V_{in}} = \frac{n}{2(1-D)} \Leftrightarrow V_{out} \geq \frac{nV_{in}}{2} \quad \text{(Equation 1)}$$

wherein:
$V_{out}$=rectified DC output voltage of the boost converter,
$V_{in}$=the DC input voltage to the boost converter;
D=a duty cycle of the PWM control signal at each transistor input of the driver and defined as: $T_{on}/T_{period}$ of a single PWM period;
n=transformer turns ratio set by the number of secondary transformer windings divided by the number of primary transformer windings.

When $$V_{out} \leq \frac{nV_{in}}{2},$$

the isolated boost converter may be in the start-up phase and the duty cycle, D, of the Pulse Width Modulated (PWM) driver control signal below 0.5.

Figure 2:
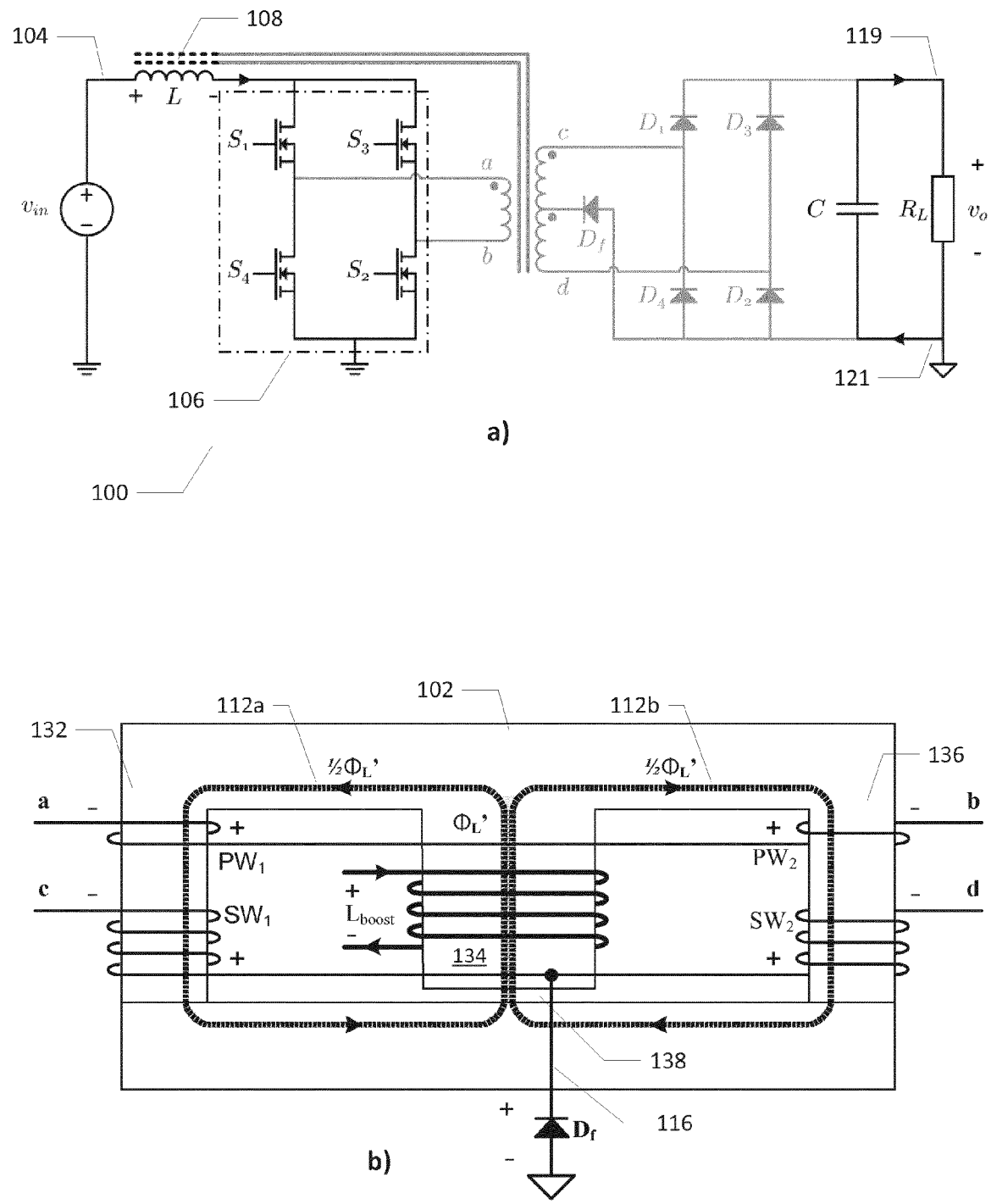
Figure 3:
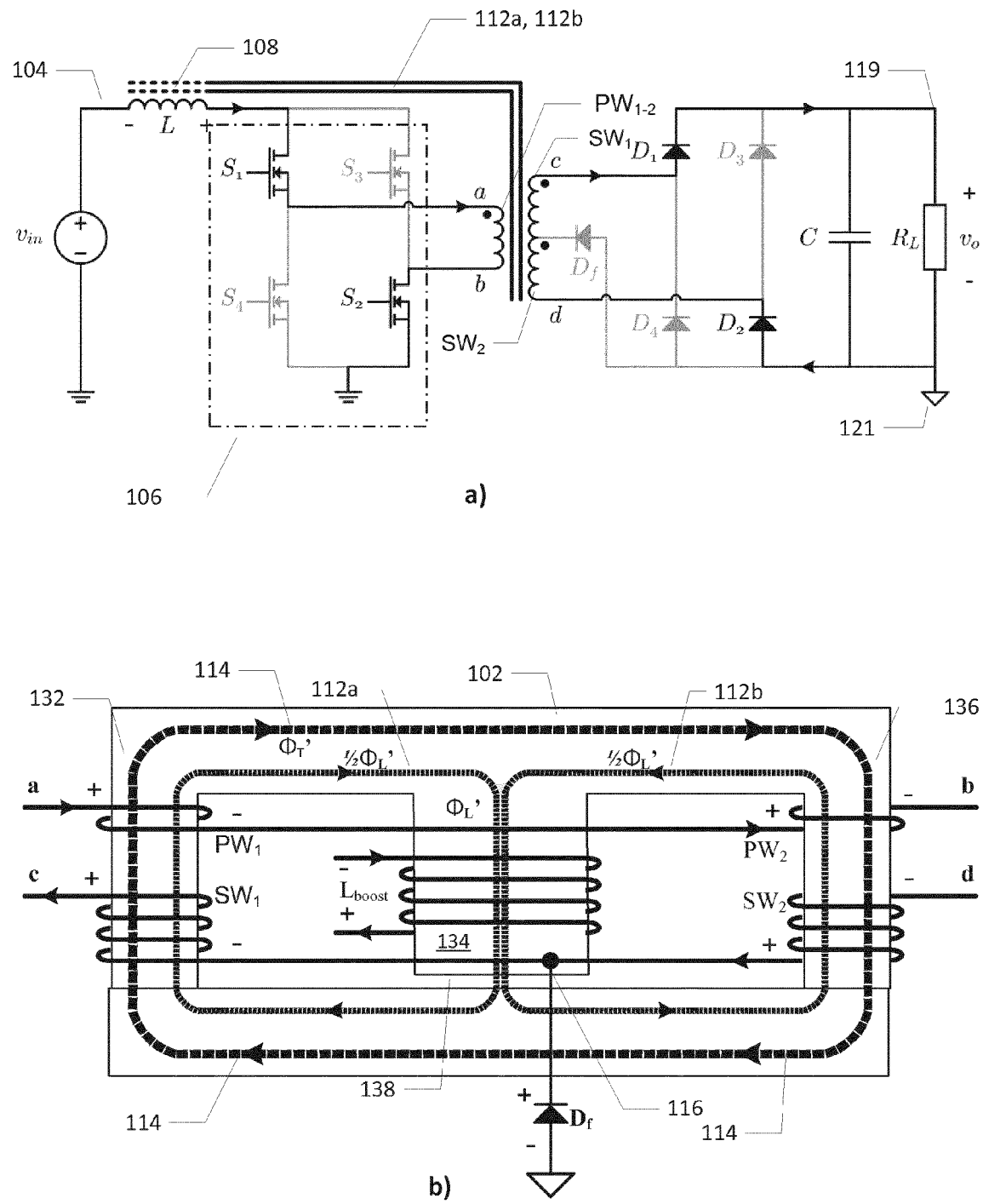
Figure 4:
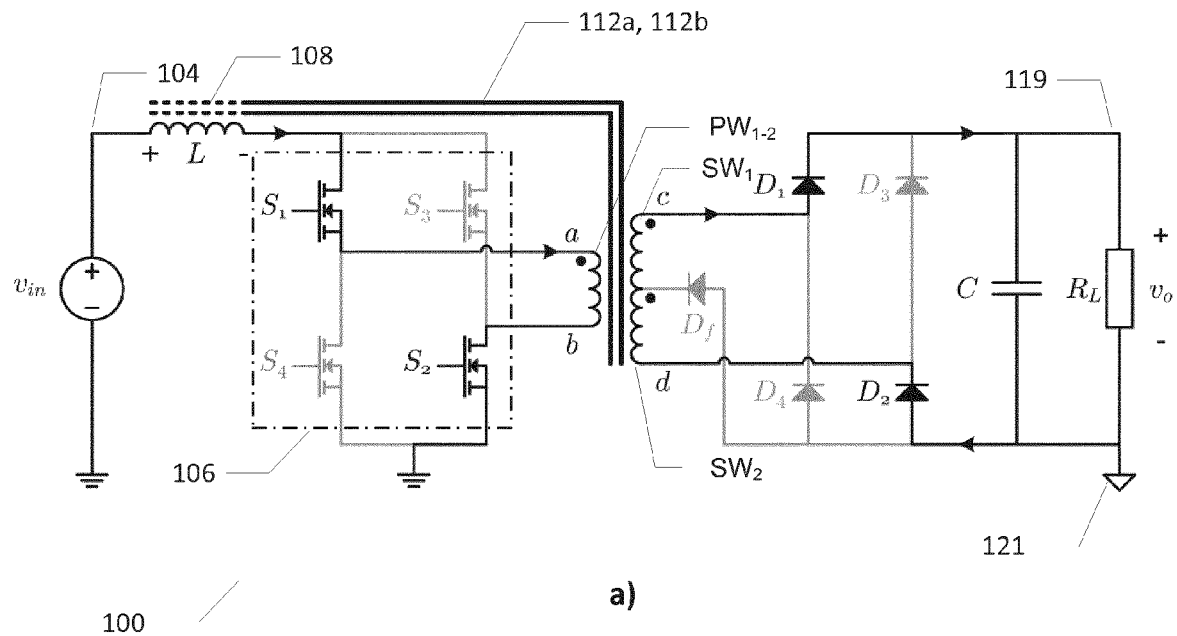
Figure 4:
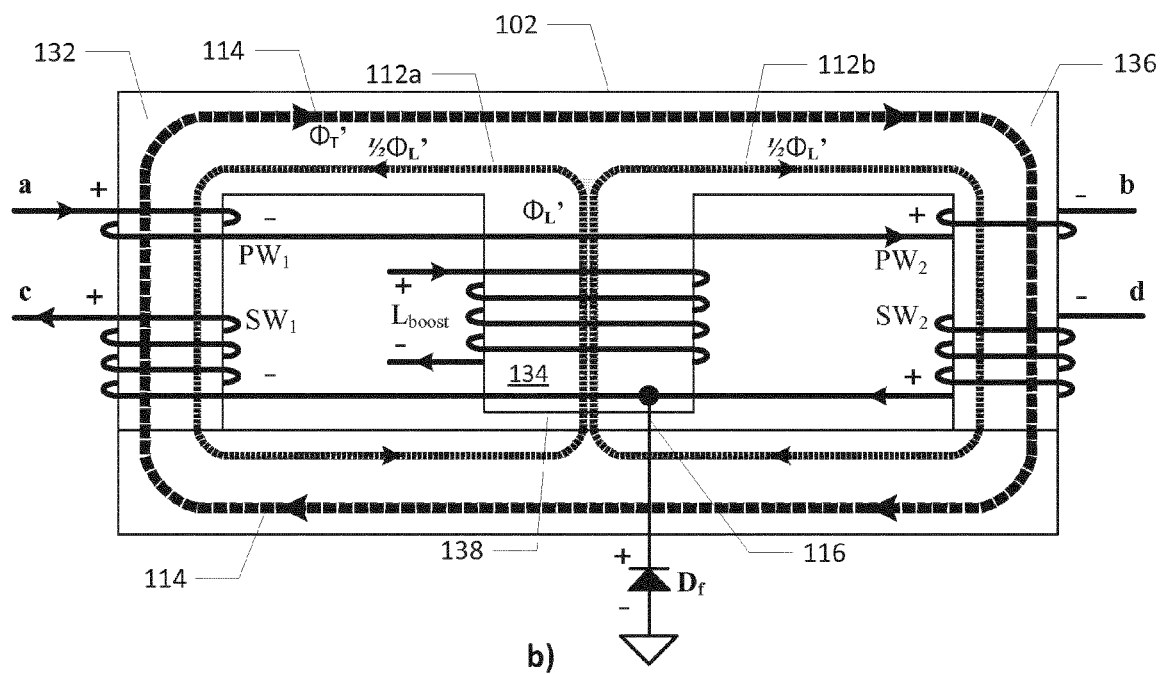

FIG. 2a) illustrates schematically an electrical circuit diagram 100 of the isolated boost power converter during a first subinterval or state boost mode operation. Circuit elements that are not carrying current have been dimmed to clarify the operation during the first state. Generally, when the duty cycle of the driver control signal, D, exceeds 0.5, the isolated boost power converter 100 operates as a normal isolated boost converter. The boost mode operation can be divided into two subintervals: The first state or boosting subinterval where all the NMOS transistors $S_1$-$S_4$ are in placed in respective conducting states or on states. A second state of the boost mode operation is an energy transfer subinterval where two of the NMOS transistors, either $S_1$-$S_2$ or $S_3$-$S_4$, are in conduction states simultaneously as illustrated on FIG. 3a) and FIG. 4a). In the latter state or subinterval boost inductor current is allowed to flow through the primary transformer winding $PW_{1-2}$ such that energy or power is transferred through the EI core 102 to the rectified output voltage. The positive direction of any currents is indicated by arrows on electrical conductors or wires and relevant voltage polarities indicated by +/− signs. FIG. 2b) shows the magnetic diagram, including flux rate induced by the boost inductor winding: dϕ/dt=ϕL', shown by fat dotted lines 112a and 112b. The rising current in $L_{boost}$ corresponds to a positive voltage drop of the input voltage, $V_{in}$. The DC flux is excluded from the analysis and the illustrated drawing as this is only relevant for magnetic saturation and power loss considerations of the EI core 102. The induced magnetic flux φL' splits evenly between the first and second outer legs 132, 136, respectively, inducing voltage drops on the transformer windings with polarities indicated by the indicated +/− signs at respective winding outputs a, b, c and d following from the right hand rule. The polarities across the two series connected primary side half-windings $PW_1$, $PW_2$ are opposite, and the voltages cancel and likewise for induced voltages across the two series connected secondary side half-windings SW1 and SW2, so it can be concluded that the boost inductor $L_{boost}$ or L is not coupled to the transformer function of the EI core 102 during this state or subinterval. Furthermore, it is also evident that $D_f$ is reverse biased in the illustrated subinterval of boost mode operation.

FIG. 3a) illustrates schematically the electrical circuit diagram of the isolated boost power converter 100 during a first discharge state, or transformer energy transfer subinterval, of the boost mode. Circuit elements that are not carrying current have been dimmed to clarify the operation in this state. During the illustrated energy transfer subinterval, the two series connected primary side half-windings $PW_1$, $PW_2$ or primary winding $PW_{1-2}$ of the EI core based transformer is connected in series with the boost inductor, such that the magnetic energy stored in the boost inductor is discharged by a discharge current flowing through the primary transformer winding such that energy is transferred to the rectified output voltage. The current direction through the primary winding $PW_{1-2}$ is alternated for every other subinterval, such that either NMOS transistors $S_1$; $S_2$ and rectifying diodes $D_1$ and $D_2$ or NMOS transistors $S_3$, $S_4$ and rectifying diodes $D_3$ and $D_4$ are conducting. FIG. 3a) shows the subinterval where the NMOS transistors $S_1$, $S_2$ and rectifying diodes $D_1$ and $D_2$ are conducting.

FIG. 3b) shows the magnetic diagram, including a flux rate, dφ/dt=φL', induced by the boost inductor $L_{boost}$. A first flux path associated with the boost inductor extends around the center leg 134, the first outer leg 132 and the air gap 138 as illustrated symbolically by fat dotted line 112a. Likewise, a second flux path extending around the center leg 134, the second outer leg 132 and the air gap 138 is illustrated symbolically by fat dotted line 112b. The flux rate induced by the primary winding $PW_{1-2}$, $d\phi_T/dt=\phi_T'$, is shown by an outer fat dotted line 114 illustrating how the flux circulates clockwise around an outer closed path or loop 114 around the outer periphery of the EI core 102 including the first and second outer legs 132, 136, respectively. As seen in FIG. 3b), the flux rate $\phi_T'$ flows in a low reluctance outer path of the EI core 102 avoiding to travel across the air gap 138 due to its high reluctance or low magnetic permeability. Using the right hand rule and the depicted voltage polarity on the two half-windings $PW_1$, $PW_2$ of the primary winding, it can be seen that these two flux rates are in the same direction along the outer flux path depicted by the fat dotted line 114. In the same manner, it is evident that the flux rate $\phi_T'$ couples to the secondary side half-windings $SW_1$ and $SW_2$ such that induced current flows from winding output d to the winding output c, forward biasing the rectifying diodes D1 and D2. From this it follows that output voltage at the mid-point 116 between the secondary side half-windings is positive with approximately one-half of the rectified converter output voltage, $V_{out}$, such that $D_f$ is reverse biased.

When instead NMOS transistors $S_3$, $S_4$ and rectifying diodes $D_3$ and $D_4$ are conducting, a corresponding analysis applies due to symmetry. In the latter case, all transformer winding voltages and currents are reversed, which still results in $D_f$ being reverse biased by one-half of $V_{out}$. It is also worthwhile to notice that in both cases, the flux rate induced by the boost inductor, L, is not coupling to the primary and secondary transformer windings $PW_{1-2}$, and $SW_1$, $SW_2$, respectively, of the EI core 102 such that the boost inductor is magnetically decoupled from the transformer operation. Furthermore, the current in the boost inductor, L, is falling, seen as a negative voltage drop across the boost inductor in both FIGS. 3a) and b).

FIGS. 4a) and b) show schematically an electrical circuit diagram and a magnetic circuit diagram, respectively, during a charging subinterval of a start-up mode. The input voltage, Vin, is charging the boost inductor while also transferring energy to the rectified output voltage through the transformer operation of the EI core 102 of the isolated boost power converter 100. This charging subinterval can be viewed as a hybrid boost and energy transfer subinterval. The MOS transistors $S_1$, $S_2$ of the driver 106 and rectifying diodes $D_1$ and $D_2$ are conducting. The operation is identical to the second subinterval discussed above in connection with FIGS. 3a) and 3b) except current in the boost inductor, L, or $L_{boost}$ is increasing as indicated by the reversed polarity of the voltage across the boost inductor. The term "hybrid" indicates that the boost inductor, L, and the primary transformer winding, $PW_{1-2}$, are both active such that magnetic energy is loaded into the boost inductor, L, at the same time as energy is transferred to the rectified output voltage through the transformer operation between the primary and secondary windings $PW_{1-2}$, and $SW_1$, $SW_2$, respectively, of the EI core 102. Consequently, during the first discharge state, the flux rate φL' induced by the boost inductor, L, is decoupled from the secondary transformer windings $SW_1$, $SW_2$ of the EI core 102 such that the boost inductor is substantially magnetically decoupled from the transformer operation.

Figure 5:
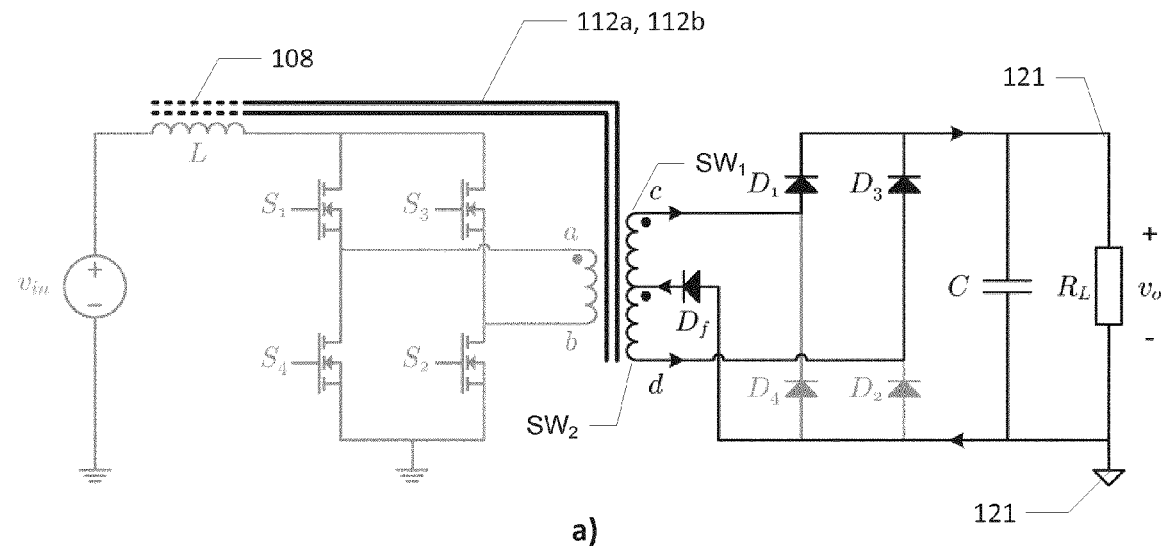
FIGS. 5a) and 5b) illustrate schematically an electrical circuit diagram and a magnetic circuit diagram, respectively, of the isolated boost power converter in accordance with the first embodiment of the invention during a second discharge state of the start-up mode wherein magnetic energy stored in a boost inductor is discharged by discharging a magnetic flux through secondary transformer windings,
  FIG. 6a) is an electrical circuit diagram of an isolated boost power converter with integration of a boost inductor and primary transformer windings in accordance with a second embodiment of the invention,
  FIG. 6b) is an electrical circuit diagram of an isolated boost power converter with a center-tapped rectification circuit in accordance with a third embodiment of the invention.
Figure 5:
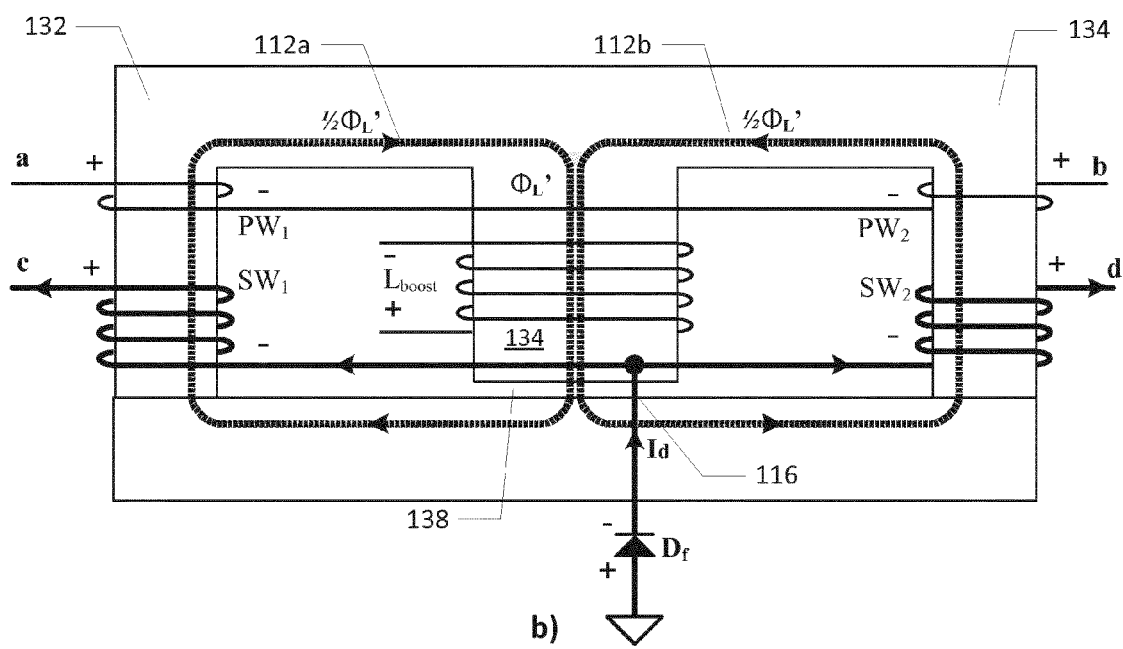

FIGS. 5a) and 5b) illustrate schematically an electrical circuit diagram and a magnetic circuit diagram, respectively, the isolated boost power converter 100 during a second discharge state. Magnetic energy stored in a boost inductor, L, is discharged by discharging a magnetic flux through secondary transformer windings $SW_1$, $SW_2$. Circuit elements that are not carrying current have been dimmed to clarify the operation during the second discharge state of start-up mode.

During the second discharge state, which can be viewed as a second subinterval of the start-up mode, the magnetic energy stored in the boost inductor, L, is discharged by circulating the stored magnetic flux through the first and second secondary transformer windings $SW_1$, $SW_2$. When all the NMOS transistors $S_1$-$S_4$ of the driver circuit 106 are turned off, i.e. non-conducting, the boost inductor current communicates to the first and second secondary transformer windings $SW_1$, $SW_2$ through the flyback diode $D_f$, as shown in FIG. 5a) by a magnetic coupling 108 as symbolically indicated on FIG. 5a). A shared magnetic flux path comprising the first and second flux paths 112a, 112b (refer to FIG. 5b)) extending around the first and second outer legs, 132, 136, respectively, magnetically coupling the boost inductor, L, to the first and second secondary transformer windings $SW_1$, $SW_2$. The cutoff or non-conducting state of the NMOS transistors of the driver leads to a suddenly dropping boost inductor current. The drop of boost inductor current results in a reverse in the respective rates of fluxes ½φL' at the first and second flux paths 112a, 112b whereby the polarity of voltage across the boost inductor is reversed (compared to FIG. 4b)). This flux rate reversal of ½φL' induces a voltage drop across each of the secondary side half-windings $SW_1$ and $SW_2$. There is a positive voltage drop from secondary winding output c to $D_f$ as well as from secondary winding output d to rectifying diode Dr. Consequently, a discharge current, $I_d$, can now travel from secondary winding output c through $D_1$ and into the load resistance $R_L$ continuing back through $D_f$. Similarly, a discharge current can travel from secondary winding output d through $D_3$ into $R_L$ and back through $D_f$. In effect, during the second discharge state of the start-up mode, the two secondary half windings $SW_1$ and $SW_2$ are working or coupled electrically in parallel from the center-tap 116 to the rectified output voltage $V_{out}$ through respective rectifying diodes $D_1$ and $D_2$ so as to jointly discharge the magnetic energy in the boost inductor. This magnetic energy is largely stored in the air gap 138. As illustrated, the magnetic energy stored in the boost inductor is converted to discharge currents flowing through the first and second secondary half windings $SW_1$ and $SW_2$ to the rectified converter output voltage, $V_{out}$ through the shared magnetic flux path 112a, 112b. Consequently, the boost inductor, L, is magnetically coupled to the first and second secondary transformer windings $SW_1$ and $SW_2$. In effect, transferring energy to the rectified output voltage during the start-up mode and allowing a gradual transition towards a state of normal boost mode operation for the isolated boost power converter 100.

Figure 6:
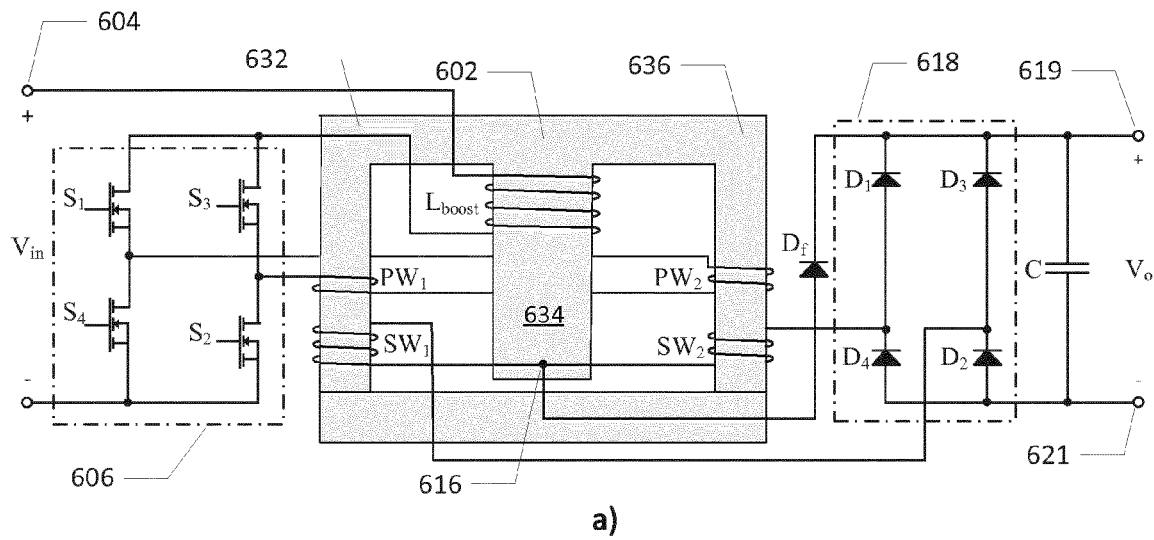
Figure 6:
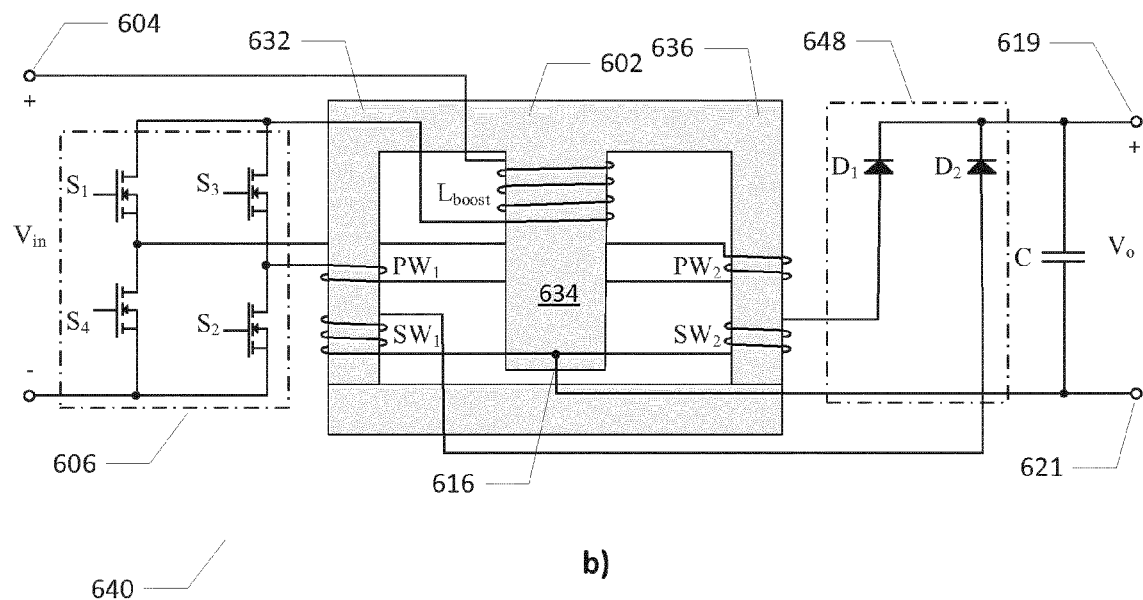

FIG. 6a) is an electrical circuit diagram of an isolated boost power converter 600 in accordance with a second embodiment of the invention. The isolated boost power converter 600 is similar to the previously described isolated boost converter 100 except for the reversal of the polarity of the rectifying diode $D_f$ and an accompanying reversal of a winding orientation of the boost inductor $L_{boost}$ relative to the winding orientation depicted on FIG. 1b). Like features have been marked with corresponding numerals to assist the comparison. The skilled person will notice that this configuration of the rectifying diode $D_f$ works similarly to the above-described configuration, in that when the primary transformer winding is inactive, a decreasing flux in the center leg will cause $D_f$ to be forward biased in either case.

FIG. 6b) is an electrical circuit diagram 640 of an isolated boost power converter with a center-tapped rectification circuit 648 in accordance with a third embodiment of the invention. The transistor based full-bridge driver 606, the primary and secondary windings $PW_1$, $PW_2$ and $SW_1$, $SW_2$, respectively, and the El core 102 itself are preferably all identical to the same features of the above-discussed first embodiment of the present isolated power converter. However, in the present embodiment, the rectification circuit only comprises two rectifying diodes $D_1$ and $D_2$ coupled from a first winding output of the first half-winding $SW_1$ and second winding output of the second half-winding $SW_2$, respectively, to a rectified converter output voltage, $V_{out}$, at positive and negative output nodes 619, 621, respectively. However, as a center-tap voltage at node 616 arranged in-between the first and second secondary transformer half-winding $SW_1$, $SW_2$ is always held at the negative rectified converter output voltage on output node 621, which may be ground level GND, there is not any need to add a rectifying diode $D_f$ in series with the center-tap 616 like in the previously discussed embodiments.

Figure 7:
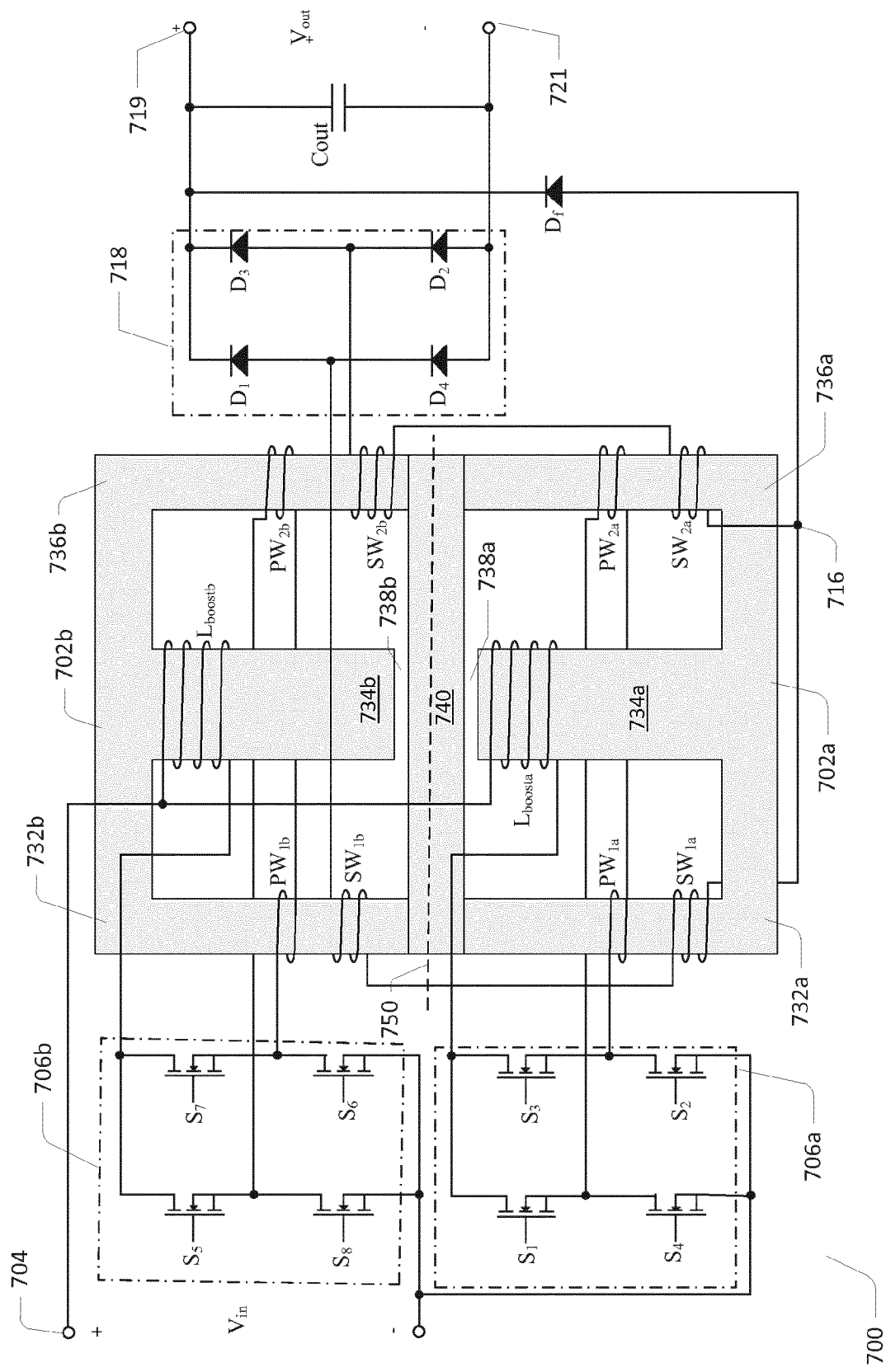
FIG. 7 is an electrical circuit diagram of an isolated boost power converter with an integrally formed dual core topology in accordance with a fourth embodiment of the invention.

FIG. 7 is an electrical circuit diagram of an isolated boost power converter 700 with a dual core topology comprising an integrally formed multi-legged El core 702a, 702b in accordance with a fourth embodiment of the invention. The isolated boost power converter 700 comprises an integrally formed magnetically permeable multi-legged core in form of a first three legged El core 702a and a second three legged El core 702b that share a common "I" leg 740 such that the entire magnetically permeable multi-legged core is a unitary structure. The structure of the integral magnetically permeable multi-legged core 702a, 702b is mirror symmetrical about a horizontal symmetry axis 750. Each of the El cores 702a, 702b comprises a center leg 734a, 734b, respectively, surrounded by a first outer leg 732a,b and a second outer leg 736a,b in a mirror-symmetrical layout or structure about a central vertical axis extending through a middle of the center legs 734a, 734b.

Each of the center legs 734a, 734b comprises an air gap 738a, 738b which allows magnetic energy of an associated boost inductor, $L_{boosta}$, and $L_{boostb}$, respectively, to be stored therein. The isolated boost power converter 700 comprises an input terminal 104 for receipt of an input voltage, $V_{in}$, which for example may be a DC voltage between 5 Volt and 100 Volt. The first and second boost inductors, $L_{boosta}$, and $L_{boostb}$, are both coupled to the input voltage at terminal 704. A first H-bridge transistor driver 706a is coupled to the first boost inductor, $L_{boosta}$, and a second H-bridge transistor driver 706b is coupled to the second boost inductors, $L_{boostb}$. Each of the first and second three legged El cores 702a, 702b have associated primary and second transformer windings, $PW_{1a}$, $PW_{2a}$ and $SW_{1a}$, $SW_{2a}$ and $PW_{1b}$, $PW_{2b}$ and $SW_{1b}$, $SW_{2b}$, respectively, in a topology similar to the topology discussed above in detail in connection with the first embodiment of the invention. However, only the center-tap 716 in-between the first and second series connected secondary transformer windings, $SW_{1a}$ and $SW_{2a}$, respectively, is coupled to a rectifying element in form of semiconductor diode $D_f$. The first and second series connected secondary transformer windings, $SW_{1b}$, $SW_{2b}$ of the second El core 702b are not connected to a center-tap but each half-winding output is coupled in series with the corresponding secondary half-winding of the first El core 702a. The isolated boost power converter 700 comprises a shared single rectification circuit 719 coupled to respective winding outputs of the first and second secondary windings $SW_{1b}$ and $SW_{2b}$. The rectification circuit 719 is configured as a full-wave rectifier comprising four rectifying diodes $D_1$-$D_4$ to produce a rectified converter output voltage $V_{out}$ between positive and negative output voltage terminals or nodes 719, 721, respectively.

It is accordingly evident that the first and second primary transformer windings $PW_{1-2a}$ and $PW_{1-2b}$ are both coupled to separate drivers 706a and 706b, respectively, while the pair of first secondary transformer windings $SW_{1a}$ and $SW_{1b}$ are coupled in series between the center tap 716 and the rectification circuit 718 and the pair of second secondary transformer windings $SW_{2a}$ and $SW_{2b}$ likewise are coupled in series between the center tap 716 and the rectification circuit 718. This topology has the beneficial effect that voltage amplification, i.e. the ratio between the input voltage $V_{in}$ and the rectified converter output voltage $V_{out}$, is doubled compared to the topology disclosed on FIGS. 1-5 due to the series connected pairs of first and second secondary windings. In addition, the shared "I" leg 740 provides further magnetics integration so as to reduce material costs, decrease size and increase efficiency due to flux cancellation in the shared "I" leg 740.

Furthermore, the first and second series connected secondary transformer windings, $SW_{1a}$, $SW_{2a}$ are configured to discharge magnetic energy stored in the first boost inductor, $L_{boosta}$, in a manner similar to one used in the above-mentioned first embodiment of the invention by a shared magnetic flux path comprising a first magnetic flux path extending through the first center leg 734a, and the first outer leg 732a and a second magnetic flux path extending through the first center leg 734a, and the second outer leg 736a. Likewise, the first and second series connected secondary transformer windings, $SW_{1b}$, $SW_{2b}$ of the upper El core 702b are configured to discharge magnetic energy stored in the second boost inductor, $L_{boostb}$, through a shared magnetic flux path in the upper El core 702b.

Figure 8:
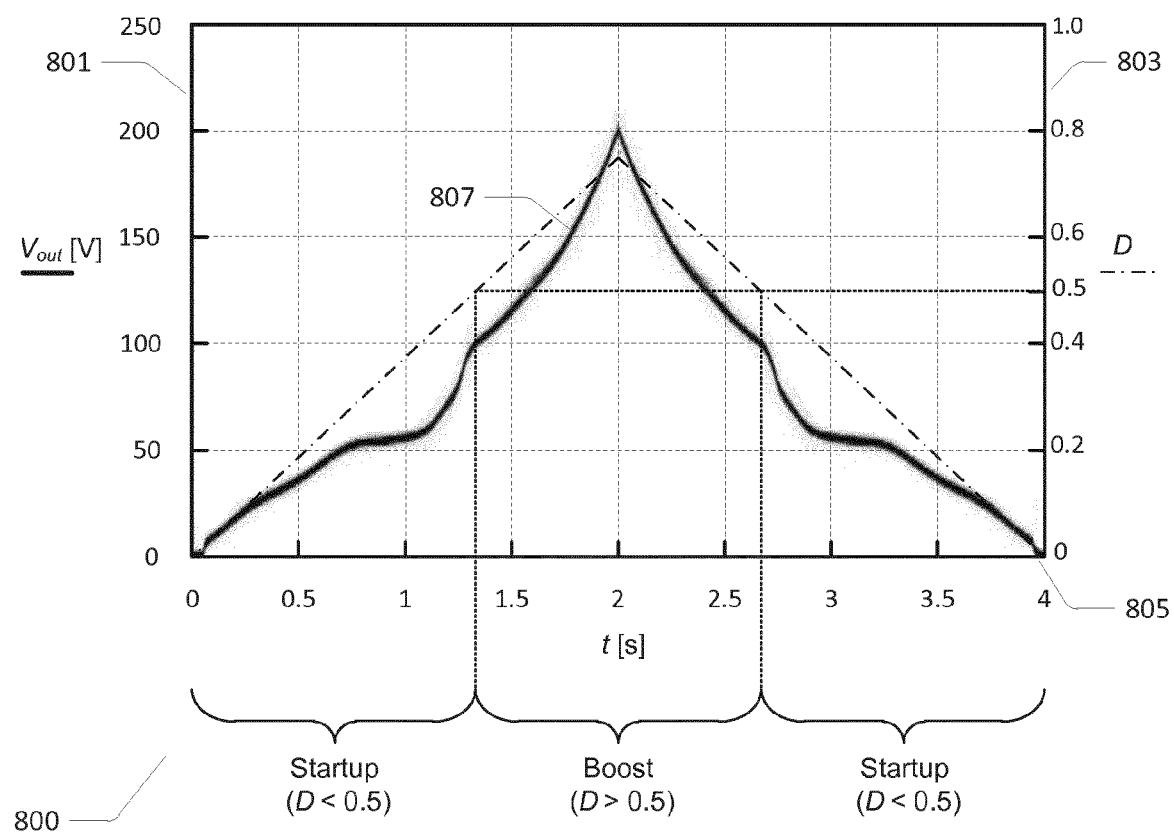
FIG. 8 is a graph depicting measurement data from an experimental isolated boost power converter in accordance with the first embodiment of the invention.

FIG. 8 is a graph 800 depicting measurement data from an experimental isolated boost power converter in accordance with the above-described first embodiment of the invention. The experimental isolated boost power converter had the following key data:

Windings on $L_{boost}$=2
primary transformer windings, $PW_{1-2}$=2
secondary transformer windings, $SW_1+SW_2$=8
DC input voltage, $V_{in}$=25 Volt
Load resistance, $R_L$=68.2 ohm
Core type: ELP64 available from manufacturer EPCOS AG.
Core material: N87
Air gap height (at center leg)=0.5 mm.

The graph data were acquired by maintaining $V_{in}$ at 25 Volt and sweeping a duty cycle, D, of a Pulse Width Modulated (PWM) driver control signal from 0 to 0.75 and then back to 0 over a time period of 4 seconds. The time variable is indicated along the x-axis 805. The corresponding duty cycle, D, is indicated on the right-hand vertical scale 803 and the measured rectified converter output voltage, $V_{out}$, indicated on the left-hand vertical scale in Volts. The substantially linear correlation between the duty cycle and the rectified converter output voltage, $V_{out}$, is evident, and is for D>0.5 in accordance with equation (1) above. It is also noticeable that the rectified converter output voltage, $V_{out}$, is continuous across the boundaries at D=0.5 between start-up mode operation and normal boost mode operation. For D=0.75, the following electrical data were measured, input current (at $V_{in}$)=27.94 A, $V_{out}$=205.11 Volt, output current=3.006 A.

Hence, the present measurement data confirms the capability of the present experimental isolated boost power converter to start-up (D<0.5) and proceed to normal boost operation (D>0.5) in a well-behaved manner without any need for a separate flyback winding or other dedicated start-up circuitry.

The invention claimed is:

1. An isolated boost power converter, comprising:
   a magnetically permeable multi-legged core comprising first and second outer legs and a center leg having an air gap arranged therein;
   an input terminal for receipt of an input voltage, $V_{in}$;
   a boost inductor being wound around the center leg or the first and second outer legs of the magnetically permeable multi-legged core;
   the boost inductor being electrically coupled between the input terminal and a driver to be alternatingly charged and discharged with magnetic energy;
   the driver having a driver output coupled to a primary transformer winding wound around the first and second outer legs of the magnetically permeable transformer core;
   the driver being configured to apply a primary voltage to the primary transformer winding in accordance with a driver control signal;
   first and second series connected secondary transformer windings with a center-tap arranged in-between and wound around the first and second outer legs; respectively, of the magnetically permeable multi-legged core; and
   a rectification circuit electrically coupled to respective outputs of the first and second secondary transformer windings to provide a rectified converter output voltage, $V_{out}$; wherein in a first discharge state, the magnetic energy stored in the boost inductor is discharged by directing a discharge current from the boost inductor through the primary transformer winding; and
   in a second discharge state, the magnetic energy stored in the boost inductor is discharged by discharging a magnetic flux through the first and second secondary transformer windings.

2. An isolated boost power converter according to claim 1, wherein the first and second secondary transformer windings are coupled in parallel from the center-tap between first and second series connected secondary transformer windings to the rectified converter output voltage, $V_{out}$.

3. An isolated boost power converter according to claim 1, wherein the second discharge state is automatically entered in response to a reversal of magnetic flux rate in the boost inductor.

4. An isolated boost power converter according to claim 1, configured to:
   during the first discharge state, magnetically decoupling the boost inductor from the first and second secondary transformer windings to deliver the magnetic energy to the primary transformer winding;
   during the second discharge state, magnetically coupling the boost inductor to the first and second secondary transformer windings through a shared flux path in the magnetically permeable multi-legged core.

5. An isolated boost power converter according to claim 1, wherein the first and second secondary transformer windings are configured to discharge the magnetic energy stored in the boost inductor by supplying a discharge current to the rectified converter output voltage, $V_{out}$, so as to transfer energy to the output, wherein the first and second secondary transformer windings act as flyback windings.

6. An isolated boost power converter according to claim 1, wherein the boost inductor is magnetically coupled to the center leg to store the magnetic energy therein.

7. An isolated boost power converter according to claim 1, wherein:
   the primary transformer winding comprises first and second series connected half-windings arranged around the first and second outer legs, respectively;
   the first and second series connected half-windings having an identical number of windings; and
   the first and second series connected secondary transformer windings have an identical number of windings.

8. An isolated boost power converter according to claim 1, wherein the driver comprises a full-bridge transistor driver having first and second complementary driver outputs coupled to respective ends of the primary transformer winding.

9. An isolated boost power converter according to claim 1, comprising a second boost inductor;
   the boost inductor being coupled between the input terminal and a first transistor driver output coupled to a first end of the primary transformer winding; and
   the second boost inductor being coupled between the input terminal and a second transistor driver output coupled to a second end of the primary transformer winding.

10. An isolated boost power converter according to claim 1, further comprising a rectifying element electrically coupled to the center-tap to conduct a discharge current, during the second discharge state, from the first and second secondary transformer windings to the rectified converter output voltage, $V_{out}$.

11. An isolated boost power converter according to claim 1, wherein the rectification circuit comprises a center-tapped rectifier wherein:

the center-tap is electrically connected to a negative rectified converter output voltage or the rectified converter output voltage, $V_{out}$; and the respective outputs of the first and second secondary transformer windings are coupled to an opposite output voltage relative to the center-tap voltage through first and second rectifying elements.

12. An isolated boost power converter according to claim 1, further comprising:

a second magnetically permeable multi-legged core;

a second boost inductor magnetically coupled to a center leg of the second magnetically permeable multi-legged core to store magnetic energy therein, the second boost inductor being electrically coupled between the input terminal and a second driver to be alternatingly charged and discharged with magnetic energy;

the second driver having a second driver output coupled to a second primary transformer winding wound around a first outer leg and a second outer leg of the second magnetically permeable transformer core;

the second driver being configured to generate a second primary voltage to the second primary transformer winding in accordance with the driver control signal; and first and second secondary transformer windings wound around the first outer leg and the second outer leg, respectively, of the second magnetically permeable multi-legged core, wherein:

the first secondary transformer winding of the second magnetically permeable multi-legged core is coupled in series between the rectification circuit and an output of the first secondary transformer winding of the magnetically permeable multi-legged core; and the second secondary transformer winding of the second magnetically permeable multi-legged core is coupled in series between the rectification circuit and the output of the second secondary transformer winding of the magnetically permeable multi-legged core such that:

in the first discharge state, the respective magnetic energies stored in the first and second boost inductors are discharged by directing respective discharge currents from the respective boost inductors through the respective primary transformer windings; and in the second discharge state, the respective magnetic energies stored in the respective boost inductors are discharged by discharging respective magnetic fluxes through the respective first and second secondary transformer windings.

13. An isolated boost power converter according to claim 12, wherein the first magnetically permeable multi-legged core and the second magnetically permeable multi-legged core share a common magnetic flux path extending through a shared magnetically permeable leg.

14. A method of generating a rectified converter output voltage, $V_{out}$, from an input voltage, $V_{in}$, by an isolated boost power converter according to any of the preceding claims, comprising steps of:

generating a pulse width modulated driver control signal;

supplying the pulse width modulated driver control signal to the driver;

gradually increasing a duty cycle, D, of the pulse width modulated driver control signal from below 0.5 to a value above 0.5; and adjusting the duty cycle, D, to a desired value to reach a desired or target AC or DC voltage at the rectified converter output voltage, $V_{out}$.

* * * * *